United States Patent [19]

Lutz

[11] Patent Number: 4,824,910

[45] Date of Patent: Apr. 25, 1989

[54] POLYMER BLEND OF CARBON MONOXIDE/OLEFIN COPOLYMER AND A POLY(VINYLPYRIDINE) POLYMER

[75] Inventor: Robert G. Lutz, Santa Rosa, Calif.

[73] Assignee: Shell Oil Company, Houston, Tex.

[21] Appl. No.: 205,973

[22] Filed: Jun. 13, 1988

[51] Int. Cl.$^4$ ................................................ C08F 1/64
[52] U.S. Cl. ...................................... 525/185; 525/539
[58] Field of Search ................................ 525/185, 539

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 3,828,016 | 8/1974 | Bacskai | 260/88.3 R |
| 3,947,526 | 3/1976 | Bacskai | 260/878 R |

FOREIGN PATENT DOCUMENTS

| | | |
|---|---|---|
| 121965 | 8/1984 | European Pat. Off. . |
| 181014 | 5/1986 | European Pat. Off. . |
| 213671 | 3/1987 | European Pat. Off. . |
| 1081304 | 9/1967 | United Kingdom . |

Primary Examiner—Harold D. Anderson
Assistant Examiner—T. Mason

[57] ABSTRACT

The invention comprises a blend of a major proportion of a linear alternating polymer of carbon monoxide and at least one ethylenically unsaturated hydrocarbon and a minor proportion of poly(vinylpyridine) polymer.

7 Claims, No Drawings

POLYMER BLEND OF CARBON MONOXIDE/OLEFIN COPOLYMER AND A POLY(VINYLPYRIDINE) POLYMER

FIELD OF THE INVENTION

This invention relates to an improved polymer blend coprisng predominantly a linear alternating polymer of carbon monoxide and at least one ethylenically unsaturated hydrocarbon. More particularly, the invention relates to blends of the linear alternating polymer and a poly(vinylpyridine) polymer.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, i.e., peroxy compounds. U.K. Pat. No. 1,081,304 produced similar polymers of higher carbon monoxide content in the presence of alkylphosphine complexes of palladium salts as catalyst. Nozaki extended the process to produce linear alternating polymers by the use of arylphosphine complexes of palladium moieties and certain inert solvents. See, for example, U.S. Pat. No. 3,964,412.

More recently, the class of linear alternating polymers of carbon monoxide and at least one ethylenically unsaturated hydrocarbon, e.g., carbon monoxide and ethylene or carbon monoxide, ethylene and propylene, has become of greater interest in part because of the greater availability of the polymers in quantity. These polymers, often referred to as polyketones or polyketone polymers, have been shown to be of the repeating formula —CO—(A)— where A is the moiety of unsaturated hydrocarbon polymerized through the ethylenic unsaturation. By way of further illustration, when the hydrocarbon is ethylene the polymer is represented by the repeating formula —CO—($CH_2$—$CH_2$)—. The general process for the more recent production of such polyketone polymers is illustrated by a number of Published European Patent Applications including Nos. 121,965 and 181,014. The process typically involves a catalyst composition formed from a compound of the Group VIII metals, palladium, cobalt or nickel, the anion of a strong non-hydrohalogenic acid and a bidentate ligand of phosphorous, arsenic or antimony.

The resulting polymers are relatively high molecular weight thermoplastics having utility in the production of shaped articles such as containers for the food and drink industry and internal as well as external parts for the automotive industry which are produced by processing the polyketones by known methods. For some particular applications it has been found desirable to have properties which are somewhat different from those of the polyketone polymers. It would be of advantage to retain the more attractive properties of the polyketone polymers and yet improve other properties. These advantages are often obtained through the provision of a polymer blend.

SUMMARY OF THE INVENTION

The present invention contemplates the provision of blends of a linear alternating polymer of carbon monoxide and at least one ethylenically unsaturated hydrocarbon and certain other polymeric material. More particularly, according to the invention, there are provided blends of the linear alternating polymer and a poly(vinylpyridine) polymer.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymer blend component have up to 20 carbon atoms inclusive, preferably up to 10 carbon atoms inclusive, and are aliphatic such as ethylene and other alpha-olefins including propylene, butylene, isobutylene, 1-hexene, 1-octene and 1-dodecene, or are arylaliphatic having an aromatic substituent on an otherwise aliphatic molecule, particularly an aliphatic substitutent on a carbon atom of the ethylenic unsaturation. Illustrative of this latter class of ethylenically unsaturated hydrocarbons are styrene, p-methylstyrene, m-propylstyrene and p-ethylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

The structure of the polyketone polymers is that of a linear alternating polymer and the polymer will contain substantially one molecule of carbon monoxide for each molecule of unsaturated hydrocarbon. When terpolymers of carbon monoxide, ethylene and a second hydrocarbon are employed, there will be within the terpolymer at least 2 units incorporating a moiety of ethylene for each unit incorporating a moiety of the second hydrocarbon. Preferably there will be within the terpolymer from about 10 to about 100 units incorporating a moiety of ethylene for each unit incorporation a moiety of the second hydrocarbon. The polymer chain will therefore be represented by the repeating formula $$-CO-(CH_2CH_2)_{\overline{x}}[CO-(G)]_{\overline{y}}$$

where G is the moiety of the second hydrocarbon polymerized through the ethylenic unsaturation. The —CO—($CH_2$—$CH_2$)— units and the -CO-(G)- units are found randomly throughout the polymer chain and the ratio of y:x is no more than about 0.5. In the modification where a copolymer of carbon monoxide and ethylene is employed as a blend component, there will be no second hydrocarbon present and the polyketone polymer is represented by the above formula where y=0. When y is other than 0, i.e., terpolymers are employed, ratios of y:x from about 0.01 to about 0.1 are preferred. The end groups or "caps" of the polymer chain will depend upon what materials are present during the production of the polymer and whether and how the polymer has been purified. The precise properties of the polymers are not dependent upon the particular end groups to any considerable extent so that the polymer is fairly represented by the above formula for the polymeric chain. Of particular interest are the polyketones of number average molecular weight from about 1,000 to about 200,000, particularly those of number average molecular weight from about 20,000 to about 90,000 as determined by gel permeation chromatography. The physical properties of such polymers will depend upon the molecular weight of the polymer, whether the polymer is a copolymer or a terpolymer and, in the case of terpolymers, the proportion of the second hydrocarbon present. Typical melting points of the polyketone polymers are from about 175° C. to about 300° C., more frequently from about 210° C. to about 270° C. The polymers have a limiting viscosity number (LVN), when measured in a standard capillary viscosity measuring device in m-cresol at 60° C. of from about 0.5 to about 10, more often from about 0.8 to about 4.

A method of producing the polymers which is now becoming conventional is to contact the carbon monoxide and unsaturated hydrocarbon(s) in the presence of a catalyst composition formed from a palladium compound, the anion of a non-hdyrohalogenic acid having a pKa below about 6 and a bidentate phosphorous ligand. The scope of the polymerization process is extensive but, without wishing to be limited, the preferred palladium compound is a palladium carboxylate, particularly palladium acetate, the preferred anion is the anion of trifluoroacetic acid, or para-toluene sulfonic acid and the preferred bidentate phosphorus ligand is 1,3-bis(diphenylphosphino)propane or 1,3-bis[di(2-methoxyphenyl)phosphino]propane. Such a process for the production of polyketone polymers is illustrated by copending U.S. patent application Ser. No. 930,468, filed Nov. 14, 1986.

Polymerization is conducted in the gas phase in the substantial absence of diluent or in a liquid phase in the presence of an inert diluent such as alkanol, e.g., methanol or ethanol. The reactants are contacted under polymerization conditions in the presence of the catalyst composition by conventional methods such as shaking or stirring in a reaction vessel. Suitable reaction temperatures are from about 20° C. to about 150° C. with preferred reaction temperatures being from about 50° C. to about 135° C. Typical reaction pressures are from about 1 bar to about 200 bar, more often from about 10 bar to about 100 bar. Subsequent to reaction the polymer is recovered by conventional methods such as decantation or filtration. The polymer product may contain residues of the catalyst composition which are removed, if desired, by treatment of the polymer product with a solvent or a complexing agent which is selective for the residues.

The minor component of the blends of the invention is a poly(vinylpyridine) polymer which is preferably a polymerized 4-vinylpyridine or a polymerized 2-vinylpyridine or polymerized mixtures thereof. Such poly(vinylpyridine) polymers are conventional and known in the art. Poly(vinylpyridine) polymer is most frequently produced by aqueous suspension polymerization in the presence of a water soluble initiator. Suitable water soluble initiators include peroxide compounds such as hydrogen peroxide, alkali metal persulfates and percarboxylic acids. The polymerization is conducted by mixing the vinylpyridine, initiator and the aqueous suspension medium and vigorously stirring. The reaction temperature is initially raised as high as 100° C. to decompose the initiator but subsequently the reaction is conducted in suspension in the liquid aqueous phase at temperatures from about 20° C. to about 90° C. Subsequent to reaction, the reaction mixture is cooled and the polymer product is recovered by conventional methods such as filtration or decantation. The vinylpyridine polymerization proceses are generally in accord with the broad teachings of Bacskai, U.S. Pat. Nos. 3,828,016 and 3,947,526, incorporated herein by reference. Some of the polymers are commercially available, marketed, for example, by the Dajac Chemical Company.

The blends of the invention comprise a mixture of a major proportion of the polyketone polymer and a minor proportion of the poly(vinylpyridine) polymer. The precise percentage of the poly(vinylpyridine) polymer to be employed in the blend is not critical and amounts of poly(vinylpyridine) polymer from about 0.5% by weight to about 45% by weight, based on total blend, are satisfactory. Amounts of poly(vinylpyridine) polymer from about 1% by weight to about 20% by weight on the same basis are preferred.

The method of producing the blend of polyketone polymer and poly(vinylpyridine) polymer is not material as long as a relatively uniform mixture of the poly(vinylpyridine) polymer throughout the polyketone is obtained. The polyketone/poly(vinylpyridine) polymer blend is a non-miscible blend with the poly(vinylpyridine) polymer existing as a discrete phase in the polykletone matrix with a phase size of from about 0.7 micron to about 2 microns, more typically on the order of about 1.4 micron, but with some cells as small as 0.05 micron. The blend will not, therefore, be homogenous but good properties are obtained when the distribution of the poly(vinylpyridine) polymer throughout the polyketone matrix is substantially uniform.

The method of blending the components is that which is conventional for non-miscible polymeric materials. In one modification the polymeric components in particulate form are mixed and passed through an extruder to produce the belnd as an extrudate. In an alternate modification, the components are blended in a mixing device which exhibits high shear.

The blends of this invention may also contain conventional additives such as antioxidants, stabilizers, fillers, fire retardant materials, mold release agents and other substances which are added to increase the processability of the polymer components or to modify the properties of the resulting blend. Such additives are added by conventional methods prior to, together with or subsequent to the blending of the polyketone polymer and the poly(vinylpyridine) polymer.

The blends of the invention are of utility where the production of articles by methods involving molten polymer is employed. The blends are processed by means of the usual techniques such as extrusion and injection molding into sheets, films, plates and shaped articles. Illustrative of applications for the blends of the invention are in the production of containers for food and drink and the production of parts for the automotive and construction industries. Incorporation of the poly(vinylpyridine) polymer in the polyketone matrix of the composition should improve the dye receptivity of the blend, therefore the blends will also be of utility where articles of consisting color are desired.

The invention is further illustrated by the following Illustrative Embodiments which should not be construed as limiting the invention.

ILLUSTRATIVE EMBODIMENT I

A linear alternating terpolymer of carbon monoxide, ethylene and propylene was produced in the presence of a catalyst composition formed from palladium acetate, the anion of trifluoroacetic acid and 1,3-bis(diphenylphosphino)propane. The melting point of the terpolymer was 225° C. and the polymer had a LVN of 1.72 when measured in m-cresol at 60° C.

ILLUSTRATIVE EMBODIMENT II

A blend of the polyketone polymer of Illustrative Embodiment I and 9.3% by weight of poly(vinylpyridine) polymer was prepared. The poly(vinylpyridine)

polymer was MP-Dajac, catalog number 8573, obtained from the Dajac Chemical Company, and having a published $T_g$ of 71° C. The polyketone, polyvinylpyridine polymer and approximately 0.2% by weight based on polyketone of Irganox 1076, a conventional hindered phenolic antioxidant to provide background stabilization, were processed through a 15mm twin-screw Baker Perkins extruder. The extruder temperature was 240° C. operating with undried feed and under a nitrogen blanket. The extruder was operated at maximum RPM to produce a residence time of 0.5 minutes and the extruded strands were passed directly into water. The resulting blend was nonmiscible as evidenced by examination of cold-cut samples, stained with ruthenium tetroxide, under an electron microscope. The polyvinylpyridine was present as a discrete phase having a predominance of cells of a phase size of approximately 1.4 micron in diameter, but with some quite small cells of a phase size on the order of 0.05 micron.

What is claimed is:

1. A composition comprising a non-miscible blend of, as a major component, a linear alternating polymer of carbon monoxide and at least one ethylenically unsaturated hydrocarbon and, as a minor component, poly(vinylpyridine) polymer.

2. The composition of claim 1 wherein the linear alternating polymer is represented by the repeating formula

wherein G is the moiety of an ethylenically unsaturated hydrocarbon polymerized through the ethylenic unsaturation and the ratio of y:x is no more than about 0.5.

3. The composition of claim 2 wherein the poly(vinylpyridine) polymer is polymerized 4-vinylpyridine, polymerized 2-vinylpyridine or polymerized mixture of 4-vinylpyridine and 2-vinylpyridine.

4. The composition of claim 3 wherein the poly(vinylpyridine) polymer is present in an amount from about 0.5% by weight to about 45% by weight, based on total blend.

5. The composition of claim 3 wherein y is zero.

6. The composition of claim 3 wherein G is a moiety of propylene and the ratio of y:x is from about 0.01 to about 0.1.

7. The composition of claim 6 wherein the poly(vinylpyridine) polymer is polymerized 4-vinylpyridine.

* * * * *